United States Patent [19]
Heinrich et al.

[11] Patent Number: 4,647,645
[45] Date of Patent: Mar. 3, 1987

[54] NON-AQUEOUS LACQUER WITH HIGH PROTECTION AGAINST STONE CHIPPING, A PROCESS FOR ITS PREPARATION AND ITS USE

[75] Inventors: Siegfried Heinrich; Rudolf Heitzmann; Ahmed Shafik, all of Wuppertal, Fed. Rep. of Germany

[73] Assignee: Herberts Gesellschaft mit beschraenkter Haftung, Fed. Rep. of Germany

[21] Appl. No.: 657,758

[22] Filed: Oct. 4, 1984

[30] Foreign Application Priority Data

Oct. 14, 1983 [DE] Fed. Rep. of Germany ....... 3337395

[51] Int. Cl.$^4$ .................. C08G 18/80; C08F 8/30; B32B 27/00
[52] U.S. Cl. ...................... 528/45; 525/124; 525/403; 525/440; 428/424.2; 428/423.1
[58] Field of Search ............ 528/45; 525/124, 403, 525/440

[56] References Cited

U.S. PATENT DOCUMENTS

| | | | |
|---|---|---|---|
| 3,023,126 | 1/1959 | Underwood et al. | 117/76 |
| 3,198,692 | 2/1963 | Bridgeford | 161/188 |
| 3,658,761 | 4/1972 | Hostettler et al. | 260/77.5 |
| 3,726,825 | 4/1973 | Woodward et al. | 260/29.2 |
| 4,021,405 | 5/1977 | Tucker et al. | 260/45 |
| 4,072,770 | 2/1978 | Ting | 427/54 |
| 4,073,975 | 2/1978 | Buckwalter et al. | 427/170 |
| 4,101,497 | 7/1978 | Charves et al. | 260/31.2 |
| 4,101,530 | 7/1978 | Burkhardt et al. | 528/45 |
| 4,163,814 | 8/1979 | Asai et al. | 260/31.2 |
| 4,197,344 | 4/1980 | Tschudy | 428/212 |
| 4,248,756 | 2/1981 | Koenig et al. | 260/31.2 |
| 4,280,944 | 7/1981 | Saito et al. | 528/45 |
| 4,299,868 | 11/1981 | Berndt et al. | 427/389.9 |
| 4,306,051 | 12/1981 | Gras et al. | 528/45 |
| 4,313,876 | 2/1982 | Gras et al. | 528/45 |
| 4,332,965 | 6/1982 | Dalibor | 528/45 |
| 4,346,144 | 8/1982 | Craven | 525/124 |
| 4,364,980 | 12/1982 | Mass et al. | 428/35 |
| 4,375,539 | 3/1983 | McBride et al. | 528/45 |
| 4,442,145 | 4/1984 | Probst et al. | 525/124 |

FOREIGN PATENT DOCUMENTS

| | | |
|---|---|---|
| 2639491 | 2/1978 | Fed. Rep. of Germany . |
| 3140834 | 1/1982 | Fed. Rep. of Germany . |
| 3137133 | 7/1983 | Fed. Rep. of Germany . |
| 1573631 | 8/1980 | United Kingdom . |

*Primary Examiner*—Herbert S. Cockeram
*Attorney, Agent, or Firm*—Mandeville and Schweitzer

[57] ABSTRACT

Non-aqueous lacquer with high resistance to stone chipping, containing, as binder, a mixture of film forming, hydroxyl-containing copolymers with blocked polyisocyanates which have been obtained by the reaction of polyhydroxyl compounds containing 2 to 4 hydroxyl groups per molecule and having a molecular weight of from 400 to 2,000 with aliphatic and/or cyclo aliphatic diisocyanates, the ratio of isocyanate groups to hydroxyl groups being in the range of from 2.2 to 1.7, followed by reaction of the remaining free isocyanate groups with acetoacetic acid alkyl esters containing, as alkyl groups, methyl, ethyl, n-propyl, i-propyl, n-butyl, i-butyl or sec.-butyl groups, a process for its preparation, and its use.

11 Claims, No Drawings

NON-AQUEOUS LACQUER WITH HIGH PROTECTION AGAINST STONE CHIPPING, A PROCESS FOR ITS PREPARATION AND ITS USE

BACKGROUND OF THE INVENTION

This invention relates to a lacquer which is highly resistant to stone chipping, containing, as binder, a mixture of film forming copolymers containing hydroxyl groups and blocked polyisocyanates in organic solvents, and the usual lacquer additives, optionally pigments and fillers. The invention also relates to a process for its preparation and to its use.

In the multilayered lacquering of car body parts, adequate resistance of the lacquer layers to stone chipping is gaining increasing importance because the front parts of the car bodies are less steep for aerodynamic reasons and larger areas of the car body are therefore exposed to stone chipping while in motion. To this is added the fact that it is becoming increasingly customary to cover icy roads in winter with grit instead of salt.

A lacquer coat resistant to stone chipping may in principle be applied in addition to the usual build up of lacquer layers (primer/top coat lacquer). It may be applied as a thick layer, as in EP-A-59 962, or as a thin layer. Protective coats against stone chipping applied as thick layers differ in the chemistry of their binders (in most cases amine cross linking, blocked isocyanates containing polyethers) from the thin layered protective coatings (OH functional copolymers, e.g. polyesters, etc. cross linking via blocked polyisocyanates). Whereas the thick layered systems give rise to rubbery elastic films, the thin layered systems are substantially harder but they are still to be regarded as tough-elastic in contrast to conventional lacquer coats, and therefore not suitable for sanding down.

If the thick layered systems are applied as thin layers, virtually no protection against stone chipping is provided (owing to their very soft structure). If, on the other hand, thin layered systems are applied as thick layers, the layers, being harder, are not rubbery elastic layers, but the films form defects such as pitting, blistering, etc.

Both types of protective layers against stone chipping are normally covered with a filler (in most cases wet-in-wet) so that smooth surfaces which can be sanded down are obtained.

Fillers belong to the state of the art of mass production lacquering of motor vehicles and should give rise to smooth surfaces by evening out any irregularities of the surface to which they are applied (high filler content). In addition, fillers are required to give rise to relatively hard films so that they can be wet sanded with 400 to 600 grade paper without the sanding paper getting blocked up with wet sanding dust. The fillers known in the art contain alkyd (polyester) resins, amine resins and possibly epoxide resins as binders. Such binders give rise to hard but not very flexible lacquer films which therefore provide only limited protection against stone chipping. There is therefore a demand in the motor vehicle industry for an additional layer protecting against stone chipping, the necessary surface characteristics for sanding down being provided by the filler above it.

One disadvantage of this arrangement is that it requires the application of an additional layer of lacquer (increased cost of materials, additional working step). The ideal would be a lacquer coat which provides good protection against stone chipping as well as having the necessary characteristics (gloss, suitability for sanding down, weathering resistance, etc.) of the given lacquer coat in the usual build up of lacquer layers.

DE-A-3,140,834 discloses a multilayered lacquering in which an intermediate layer based on a maleic acid anhydride adduct of diene polymers optionally modified by partial esterification with monohydric alcohols and/or unsaturated hydrocarbon resins and/or hydrolysed, and dissolved in organic solvents or in water, is applied between the primer and the top coat. Such binders, however, require high stoving temperatures of about 180° to 200° C. for at least about 15 minutes. There is a great demand for low stoving temperatures, if possible below 140° C.

From EP-A-59 962 there is known a protective layer against stone chipping for motor vehicles, in which the binder is a storage stable mixture of certain amines with a prepolymer having an average molecular weight of from 500 to 15,000, containing an average of 2 to 6 ketoxime blocked NCO groups linked to the prepolymer by cycloaliphatic and/or aliphatic groups.

Similar binder formulations are described in DE-A-2,131,299, 3,108,861 and 2,814,079. The protective layers obtained with these binders have excellent properties but the amines used in these binders are undesirable for reasons of industrial hygiene.

It is an object of the present invention to find a lacquer which is resistant to stone chipping and which can be stoved at low stoving temperatures, e.g. of 120° C. and has a marked stability in storage even at temperatures above 25° C. and is resistant to weathering influences. In addition, this lacquer is required to form films which are extremely resistant to stone chipping even at layer thicknesses of less than 50 μm. Furthermore, it is an object of the present invention to provide a process for the preparation of a lacquer forming layers which are resistant to stone chipping, according to which there may also be used pigments which are difficult to disperse.

It has now been found that this problem can be solved in a surprisingly simple manner by using, as binder for the lacquer, a storage stable mixture of copolymers containing hydroxyl groups and certain blocked isocyanates.

The invention relates to a non-aqueous lacquer with high resistance to stone chipping, containing, as binder, a mixture of film forming, hydroxyl-containing copolymers with blocked polyisocyanates in organic solvents and the usual lacquer additives, optionally pigments and fillers, characterised in that the blocked polyisocyanates were obtained by the reaction of polyhydroxyl compounds containing 2 to 4 hydroxyl groups per molecule and having a molecular weight of from 400 to 2,000 with aliphatic and/or cycloaliphatic diisocyanates, in which the ratio of isocyanate groups to hydroxyl groups is from 2.2 to 1.7, followed by reaction of the remaining free isocyanate groups with acetoacetic acid alkyl esters containing methyl, ethyl, n-propyl, i-propyl, n-butyl, i-butyl or secondary butyl groups as alkyl groups.

The ratio of isocyanate groups to hydroxyl groups is preferably in the range of from 2.1 to 1.8, most preferably from 2.1 to 1.9.

The lacquer is generally applied to the car body parts of the motor vehicle after they have been primed in the usual manner. A so called EC priming (Electro coating lacquering) is preferred. This contains partly neutralised binders dispersed in water, prepared, for example, on the basis of natural or synthetic maleate oils, acid polyesters or acrylate resins or amino epoxide resins, as described, for example, in DE-A-2,737,174, DE-A-2,824,428, EP-A-04 090 and DE-A-3,122,641, in combination with pigments and fillers.

When the work piece which is to be coated, e.g. a car body, is immersed in the aqueous dispersion and an electric voltage of from 100 to 400 volt is applied, the lacquer is deposited either at the anode or at the cathode, depending on the type of binder. The lacquer film applied in this manner is subsequently stoved, e.g. at temperatures of from 160° to 200° C.

The primer may be in the form of several layers.

The lacquer according to the invention may then be applied to this primer. The film forming, hydroxyl-containing copolymers present in this lacquer are those used in the state of the art for the preparation of film-forming coatings in combination with blocked isocyanates.

In addition to the polymer resins proper, such as polyacrylate resins, the copolymers containing hydroxyl groups may also be polycondensation resins such as polyesters, alkyd resins, epoxide resins, etc. and polyaddition resins such as polyurethane resins.

The polymer resins used are mainly polyacrylate resins, which have already been described in numerous Patent Specifications, such as DE-A-1,595,243, DE-A-2,054,231, DE-A-2,021,178, DE-A-2,603,259 et al. These resins are polymers of acrylic monomers such as (meth) acrylic acid, methyl (meth) acrylate, hydroxyethyl (meth) acrylate, etc., styrene or vinyl compounds, etc., as described also in Wagner/Sarx, Lackkunstharze, 5th Edition, Chapter 4, pages 229 to 238.

The polycondensation resins may be either polyester and alkyd resins or epoxide resins. Polyester resins are reaction products of aliphatic, cycloaliphatic and/or aromatic mono- and/or polycarboxylic acids with aliphatic and/or cycloaliphatic mono and/or polyols. Polyesters and alkyd resins which contain compounds such as adipic acid, benzoic acid, p-tertiary-butyl-benzoic acid, maleic acid, fumaric acid, o-, m- or p-phthalic acid, sebacic acid, tetrahydro or hexahydrophthalic acid, trimellitic acid or aliphatic, saturated and/or unsaturated monocarboxylic acids with a carbon number of from 6 to 20 as their carboxylic acid component and compounds such as ethylene glycol, propylene glycol, glycerol, pentaerythritol, neopentyl glycol, trimethylol propane, hexanediol, hydroxypivalic acid neopentyl glycol ester, diethylene glycol or dipropylene glycol as their alcohol component are particularly preferred. Such polyesters and alkyd resins are described in HoubenWeyl, Makromolekulare Stoffe II, Volume 14/2, pages 4–42 and in Ullmann "Encyklopädie der technischen Chemie", 4th Edition, Volume 19, pages 61–86. It is preferred to use polyesters or alkyd resins which have an arithmetically calculated average molecular weight of from 500 to 5,000 and a hydroxyl functionality of from 2 to 10.

The polyepoxide compounds with hydroxyl groups used may have a hydroxyl value of from 0.2 to 0.4 mol OH per 100 g of resin and an average molecular weight of from 800 to 4,000 g/mol and have been prepared from epichlorohydrin and bisphenol A. Such compounds are described in Ullmann, Encyklopädie der technischen Chemie, 4th Edition, Volume 10, pages 563 to 580. Owing to their chemical structure, however, these polyepoxide compounds containing hydroxyl groups cannot be used for the preparation of lacquers which are to be used for the production of lacquer films which are exposed to weathering.

The polyaddition resins used are prepared from hydroxyl-containing polyethers, in particular polypropylene glycols, and/or polyols with di- and/or tri-functional isocyanates, small quantities of primary or secondary amines being optionally used as isocyanate reactive substances and the resulting reaction products carrying OH groups. Reaction products containing OH groups obtained from polyesters containing OH groups and polyisocyanates may also be used. Polyaddition resins having an OH number of from 50 to 200 and an OH functionality of from 2 to 6 are preferred.

The copolymers are used in admixture with the polyisocyanates defined below. The polyhydroxyl compounds used for the preparation of the special blocked polyisocyanates may in principle be any polyhydroxyl compounds having an average molecular weight of from 400 to 2,000.

For example, hydroxyl-containing polyesters prepared by the condensation of monohydric and/or polyhydric alcohols with monobasic and/or polybasic carboxylic acids may be used for the preparation of the blocked polyisocyanates. Polyesters containing hydroxyl groups, prepared by the reaction of $\epsilon$-caprolactone with low molecular weight polyols, may also be used. Examples of such polyols include: trimethylol propane, glycerol, hexanediol-(1,6), ethylene glycol, propanediol-(1,2), pentaerythritol, etc. or mixtures of such polyols.

Hydroxyl-containing polyethers derived from ethylene glycol, propanediol-(1,2), butanediol-(1,4), etc. may also be used for the preparation of the blocked polyisocyanates according to the invention.

Polyurethanes containing hydroxyl groups, prepared from di (poly)-isocyanates and polyols may be used for the preparation of the blocked polyisocyanates.

Hydroxyl-containing polyacrylates, epoxide compounds, etc. may in principle also be used, provided their average molecular weight is in the range of from 400 to 2,000.

These hydroxyl compounds used for the preparation of the blocked polyisocyanates according to the invention are reacted with the aliphatic and/or cycloaliphatic diisocyanates defined above. Examples of these include hexamethylene diisocyanate, trimethyl hexamethylene diisocyanate, 3-isocyanatomethyl-3,5,5-trimethyl cyclohexyl isocyanate and dicyclohexyl methane diisocyanate. Stone chipping protective layers containing these isocyanates can easily be over lacquered, e.g. with fillers or with pigmented top coat lacquers or clear lacquers. This over lacquering may be carried out wet-in-wet, as is well known in this field of the art.

The quantitative proportion of copolymer to blocked polyisocyanate should advantageously be chosen to provide at least 0.5 equivalents and not more than 2 equivalents of blocked isocyanate groups to 1 equivalent of hydroxyl groups. A ratio of 0.8 to 1.3 equivalents of blocked isocyanate groups in the isocyanate component to 1 equivalent of hydroxyl groups in the copolymer component is particularly preferred.

The organic solvents used are advantageously aromatic hydrocarbons such as xylene, Solvesso 100 (Esso) (registered Trade Mark), glycol esters such as ethyl glycol acetate, esters such as butyl acetate, alcohols such as isopropanol, ethers such as ethylene glycol dimethyl ether or other organic solvents capable of dissolving the binders. The solvent used may consists of only one of the individual compounds described or of a mixture of these substances.

The lacquer according to the invention contains about 10 to 50 parts by weight of solvent, preferably about 15 to 35 parts by weight of solvent, to 100 parts by weight of binder, i.e. to the total quantity of copolymer and blocked isocyanate.

In addition, the lacquer contains the usual additives such as silicone oils or low molecular weight acrylic polymers (levelling agents), pigment wetting agents (soya lecithin), plasticizers (Palatinol C, registered Trade Mark), epoxide resins, UV absorbents, fillers such as heavy spar, kaolin or talcum; thixotropic agents such as Aerosil or Bentone (both registered Trade Marks); catalysts such as organic zinc compounds.

The lacquer may also contain pigments to impart the desired colour shade or covering power. As already mentioned above, lacquer coats which render an additional protective layer against stone chipping superfluous are particularly desired. The lacquer according to the invention may be formulated and used as filler layer and/or as top coat lacquer (one layered or two layered top lacquer). An additional protective layer against stone chipping is then not required. Since the top coat lacquer is readily damaged and removed by stone chipping, the layer underneath it should preferably have the same pigmentation as the top coat lacquer or at least a similar colour shade. It is well known that motor vehicles are frequently lacquered in luminous colours. The pigments used for this purpose are frequently very difficult to disperse, i.e. temperatures of at least 40° C. must be applied for dispersing these pigments in the binder. This is not possible, however, if the binders used for lacquer formulations made up for stoving temperatures below 130° C. are mixtures or preadducts of hydroxyl-containing copolymers and blocked polyisocyanates because these at least partly react at the temperatures above 40° C. used for grinding or dispersion. It has been found that this problems can be solved in a surprisingly simple manner if the lacquer according to the invention is prepared by dispersing the pigments in the film forming, hydroxy-containing copolymers in the usul manner and only thereafter stirring in the polyisocyanates at temperatures below about 45° C. The process is eminently suitable for pigments which are extremely difficult to disperse, e.g. which require temperatures above 40° C. and even above 60° C. for dispersion. Since stirring the polyisocyanates into the dispersion is completed within a short time, temperatures of up to about 50° C. may be used for this purpose. It is important that the finished lacquers should be cooled to room temperature as soon as possible but they have excellent stability in storage even at temperatures above 25° C. However, they should not be stored at temperatures above 35° C. for prolonged periods of several weeks or months. Tests have shown that the lacquers according to the invention may be stored for more than 3 weeks at a test temperature of 32° C. without any marked increase in viscosity being observed.

Dispersion of the pigments at elevated temperatures is necessary in order to achieve a good levelling flow of the lacquer and even and steady spread of the top coat lacquer with high gloss and freedom from streakiness. Anthraquinone, molybdate, iron oxide and phthalocyanine pigments are examples of pigments which are difficult to disperse.

The lacquer according to the invention is used for forming thin lacquer coats which are resistant to stone chipping, in particular coats with a dry film thickness of from 15 to 50 $\mu$m. A dry film thickness of from 20 to 45 $\mu$m is preferred.

Application of the lacquer according to the invention is carried out in the usual manner by spraying, airless spraying, electrostatic spraying, etc.

The lacquer is subsequently stoved, and for this, relatively low temperatures may be employed. If no additional layers are subsequently to be applied wet-in-wet, stoving may be carried out at temperatures of about 120° to 180° C., temperatures below 160° C., preferably below 140° C. and even below 130° C. being generally sufficient.

The stoving times are less than 60 minutes, preferably less than 40 minutes, most preferably below 30 minutes. Stoving may be carried out, for example, for 20 to 25 minutes at about 120° C.

Such low stoving temperatures are also advantageous if an additional layer of lacquer is subsequently to be applied wet-in-wet. The fillers known in the art may be stoved at very low temperatures and are advantageously applied wet-in-wet, as already mentioned, so that the layer protecting against stone chipping and the filler can be stoved in a single operation.

Preparation of the polyisocyanates used according to the invention is described, for example, in DE-A-2,612,783 or may be carried out by the process mentioned there.

EXAMPLE OF PREPARATION A 807 g of a polycaprolactone triol (CAPA 305, registered Trade Mark of INTEROX Chem. Ltd.) were reacted at 80° C. in a reaction vessel with 1050 g of ethyl glycol acetate and 995 g of 3-isocyanatomethyl-3,5,5-trimethyl-cyclohexyl isocyanate until the isocyanate content was 6.6% by weight. 637 g of ethyl acetoacetate were then added and the temperature was maintained at 100° C. in the presence of 10 g of zinc acetyl acetonate until the isocyanate content had been reduced to less than 0.1% by weight.

EXAMPLE OF PREPARATION B 807 g of the polycaprolactone triol from Example of preparation A are reacted in a reaction vessel at 80° C. with 772 g of ethyl glycol acetate and 995 g of 3-isocyanatomethyl-3,3,5-trimethyl-cyclohexyl diisocyanate until the isocyanate content was 7.3% by weight. The reaction mixture was then immediately cooled to room temperature.

EXAMPLE 1

A lacquer for protecting against stone chipping was prepared from the following components:
21.5 g of hydroxyl-containing polyester (Desmophen 670, 75% in ethyl glycol acetate, product of BAYER AC Leverkusen),
0.5 g of finely divided silicon dioxide (Aerosil, registered Trade Mark),
1.0 g of carbon black,
4.0 g of titanium dioxide (Rutile) (pigment),
29.0 of barium sulphate (filler),
3.0 g of butyl acetate,
31.7 g of polyisocyanate according to Example of preparation A,
9.3 g of butyl acetate.

All the components except the last two were ground in a bead mill at 45°–50° C. to disperse the pigments and fillers in the binder. The ground up material was then removed from the mill and the last two components were stirred in.

The mixture obtained after grinding and mixing was adjusted to a viscosity of 40 seconds in the AK 4 cup at 20° C. by means of a mixture of 2 parts by weight of ethyl glycol acetate and 1 part by weight of a mixture of aromatic hydrocarbons (Solvesso 100, registered Trade Mark).

The lacquer from Example 1 was sprayed on an electro dip lacquered phosphated steel sheet and lacquered over, wet-in-wet, with a commercial filler. The two layers of lacquer were hardened together in a circulating air oven as indicated in Table 1. A commercial top coat lacquer was then sprayed on them and hardened for 15 minutes at 130° C.

| Dry film thicknesses: | Electro dip layer | 10 μm |
|---|---|---|
| | layer protecting against stone chipping | 21 μm |
| | filler layer | 21 μm |
| | top coat lacquer layer | 50 μm |

The stone chipping test was carried out with a VDA (Verband der Automobilindustrie) test apparatus manufactured by Erichsen, Model No. 508.

The test conditions were as follows:

| preliminary pressure of tank | 4.5 bar |
|---|---|
| Nozzle pressure | 1.0 bar |
| quantity of steel scrap | 500 g |
| bombardment time | 5 s |

TABLE 1

| Storing conditions for the "wet in wet " stone chipping protective/ filler layer | Assessment according to DIN 53230 Example 1 |
|---|---|
| 20 minutes 125° C. | 1 |
| 20 minutes 140° C. | 1 |

The factor assessed was the quantity of lacquer layer chipped off, expressed in code numbers according to DIN 53230.

The storage stability was determined by viscosity measurements carried out in the course of storage of the lacquer at 32° C. Both the lacquer formulation of Example 1 and the corresponding pure binder combination (clear lacquer) were tested.

TABLE 2

| | Viscosity Example 1 | |
|---|---|---|
| after days | (with pigments) | (without pigments) |
| | (mPas/20° C.) | |
| 0 | 500 | 2300 |
| 4 | 500 | 2500 |
| 11 | 500 | 2400 |
| 21 | 520 | 2400 |
| 30 | 570 | 2500 |

Measuring apparatus: Rotoviscko RV 21 (Haake), measuring head 500.
Measuring system: cup, rotary body MV I
The viscosities were determined at the following velocity gradients D ($s^{-1}$):

58 $s^{-1}$ for the binder (without pigments)
231 $s^{-1}$ for the stone chipping protective lacquer (with pigments)

EXAMPLE 2

The procedure was as described in Example 1, using the following components:
10.5 g of polyesters containing hydroxyl groups (Desmophen 800, 85% in ethyl glycol acetate, BAYER AG, Leverkusen)
1.34 g of Acronal 700 L (registered Trade Mark of BASF)
5.12 g of decomposed Bentone 38 (registered Trade Mark)*
5.12 g of Bayertitan RKB-2 (registered Trade Mark)
0.52 g of Bayferrox 303 T (registered Trade Mark)
17.10 g of Blancfixe N (registered Trade Mark)
0.67 g of Aerosil 200 (registered Trade Mark)
35.96 g of polyisocyanate (example of preparation A)

* decomposed Bentone having the composition:
12.5 g of Bentone 38
5.0 g of butanol
82.5 g of xylene.

The mixture obtained after grinding and mixing was adjusted to a viscosity of 40 sec. in the AK 4 cup at 20° C. by means of a mixture of 2 parts by weight of ethyl glycol acetate and 1 part by weight of a mixture of aromatic hydrocarbons (Solvesso 100, registered Trade Mark).

The mixture was ground at 60° C. for 30 minutes to ensure good levelling properties.

The lacquer formulation of Example 2 is similar to typical filler formulations known in the art as regards the pigments and fillers used and the pigment/binder ratio. The film obtained from the lacquer according to Example 2 provides protection against stone chipping with filler properties and can be sanded down and directly over lacquered with top coat lacquer.

The lacquer was sprayed on electro dip lacquered phosphated steel sheets and hardened for 20 minutes at 125° C. (dry film thickness 37 μm). The resulting lacquer coat was tested for its surface hardness by means of an Erichsen pendulum hardness measuring apparatus (pendulum hardness according to König) and tested for its suitability for wet sanding with sanding paper of grade 600 (the paper must not get clogged up with wet sanding dust.).

TABLE 3

| Test | Example 2 |
|---|---|
| Stone chipping test (as in Example 1) | 1–2 |
| Suitability for sanding | yes |
| storage stability | viscosity is constant |
| capacity for pigmentation at 60–80° C. | unlimited |
| pendulum hardness (according to Konig) | 121 s |

EXAMPLE 3

A coloured pigmented lacquer was prepared from the following components:
315 g of polyester containing hydroxyl groups (Desmophen 800, 85% in ethyl glycol acetate, registered Trade Mark)
659 g of titanium dioxide RN 59 of Kronos
35 g of Sicotransrot L 2817 (manufacturers BASF registered Trade Mark)
9 g of finely divided silicon dioxide 1079 g of polyisocyanate (example of preparation A)

The first four components were dispersed in a laboratory bead mill (manufacturers DRAIS, Model PM 1) for 30 minutes at 70° C. together with 730 g of glass beads (2 mm diameter).

The material was then separated from the glass beads, the remaining components were added and the resulting mixture was adjusted to an AK 4 cup outflow time of 40 seconds at 20° C. by means of ethyl glycol acetate.

COMPARISON EXAMPLE 1

The procedure was the same as in Example 3 except that dispersion was carried out at 45° C. In order to obtain the same intensity of colour according to DIN 53238 in the stoved film as in Example 3, the process of dispersion had to be continued for more than 60 minutes.

EXAMPLE 4

A clear lacquer resistant to stone chipping was formulated with the following components:
11.00 g of Macrynal SSM 510 n (60% in xylene/ethyl glycol acetate 2:1)*
62.95 g of Desmophen 670 (75% in ethyl glycol acetate)*
1.40 g of Baysilonöl OL (10% in xylene)*
5.00 g of butyl acetate
0.50 g of Tinuvin 292*
0.50 g of Tinuvin 328*
6.00 g of ethyl glycol acetate
106.40 g of polyisocyanate (example of preparation A)
* registered Trade Mark.

The components were mixed one after the other and adjusted to an AK 4 viscosity (20° C.) of 35 s with ethyl glycol acetate after addition of the polyisocyanate component.

COMPARISON EXAMPLE 2

The procedure was the same as in Example 4 but instead of 106.40 g of the polyisocyanate component (example of preparation A), there were used 78.70 g of the unmasked polyisocyanate which was otherwise identical (example of preparation B). The equimolar ratio of NCO groups to OH groups is identical to that of Example 4.

A commercial bronze base coat (colour: silver metallic) was sprayed on phosphated test sheets which had been electro dip lacquered and over lacquered with commercial filler. After a ventilation time of 10 minutes at about 25° C., the lacquer from Example 4 or Comparison Example 2 was sprayed on wet-in-wet and cured in a circulating air oven at 120° C. for 30 minutes.

Both test sheets were tested for their stability to weathering in a rapid weathering apparatus manufactured by Atlas, Electric Devices Company, Chicago; Trade Mark UVCON. The results are shown in Table 4 and show no significant difference in gloss retention between the lacquer prepared with the polyisocyanate according to the invention and that prepared with unmasked polyisocyanate.

TABLE 4

|  | Example 4 | Comparison Example 2 |
| --- | --- | --- |
| Initial gloss | 88% | 87% |
| Gloss after 650 hours UVCON | 42% | 45% |
| The gloss was measured with an apparatus manufactured by Byk Mallinckrodt, Wesel: | | |
| Type: | Multigloss 4060, | |
| Measuring angle: | 20° | |

We claim:
1. A non-aqueous lacquer with high resistance to stone chipping, containing, as binder, a mixture of film forming, hydroxyl-containing copolymers with blocked polyisocyanates in organic solvents and the usual lacquer additives, said blocked polyisocyanates being obtained by the reaction of polyhydroxyl compounds containing 2 to 4 hydroxyl groups per molecule and having a molecular weight of from 400 to 2,000 with aliphatic and/or cycloaliphatic diisocyanates, using an isocyanate to hydroxyl group ratio of from 2.2 to 1.7, followed by reaction of the remaining free isocyanate groups with acetoacetic acid alkyl esters containing, as alkyl groups, methyl, ethyl, n-propyl, i-propyl, n-butyl, i-butyl, or sec. butyl groups.

2. Non-aqueous lacquer according to claim 1, characterised in that the ratio of isocyanate to hydroxyl groups is from 2.1 to 1.8.

3. Non-aqueous lacquer of claim 2 further comprising pigments and fillers.

4. Process for the preparation of the dispersion of the components of the non-aqueous lacquer of claim 3, comprising the steps of
  (a) dispersing the pigments in the film forming, hydroxyl-containing copolymers at temperatures higher than about 40° C., and
  (b) subsequently mixing the blocked polyisocyanates into said dispersion of step (a) at temperatures below about 45° C.

5. Non-aqueous lacquer of claim 1, further comprising pigments and fillers.

6. Non-aqueous lacquer of claim 1, wherein the ratio of isocyanate to hydroxyl groups is from 2.1 to 1.9.

7. Non-aqueous lacquer of claim 5, wherein the ratio of isocyanate to hydroxyl groups is from 2.1 to 1.9.

8. Process for the preparation of the dispersion of the components of the non-aqueous lacquer of claim 5, comprisng the steps of
  (a) dispersing the pigments in the film forming, hydroxyl-containing copolymers at temperatures higher than about 40° C., and
  (b) subsequently mixing the blocked polyisocyanates into said dispersion of step (a) at temperatures below about 45° C.

9. Process according to claim 8, wherein the film-forming hydroxyl-containing copolymers are dispersed at temperatures higher than about 60° C.

10. Process according to claim 8, wherein other additives are stirred in with the blocked polyisocyanates.

11. Lacquer obtained by the process of claim 8.

* * * * *